US012726231B2

(12) United States Patent
Tramoni et al.

(10) Patent No.: US 12,726,231 B2
(45) Date of Patent: Sep. 1, 2026

(54) NFC DEVICE DETECTION

(71) Applicants: STMicroelectronics (Rousset) SAS, Rousset (FR); STMicroelectronics France, Montrouge (FR); STMicroelectronics Razvoj Polprevodnikov D.O.O., Ljubljana (SI)

(72) Inventors: Alexandre Tramoni, Le Beausset (FR); Kosta Kovacic, Orehova vas (SI); Florent Sibille, Grenoble (FR); Nicolas Cordier, Aix-en-Provence (FR); Anthony Tornambe, Rousset (FR); Jean Remi Ruiz, Greasque (FR); Guillaume Jaunet, Pegomas (FR)

(73) Assignees: STMicroelectronics France, Montrouge (FR); STMicroelectronics (Rousset) SAS, Rousset (FR); STMicroelectronics Razvoj Polprevodnikov D.O.O., Ljubljana (SI)

( * ) Notice: Subject to any disclaimer, the term of this patent is extended or adjusted under 35 U.S.C. 154(b) by 806 days.

(21) Appl. No.: 18/094,309

(22) Filed: Jan. 6, 2023

(65) Prior Publication Data

US 2023/0223989 A1 Jul. 13, 2023

(30) Foreign Application Priority Data

Jan. 10, 2022 (FR) ...................................... 2200146

(51) Int. Cl.
*H04B 5/70* (2024.01)
*H04B 5/77* (2024.01)

(52) U.S. Cl.
CPC ................. *H04B 5/70* (2024.01); *H04B 5/77* (2024.01)

(58) Field of Classification Search
CPC . H04B 5/70; H04B 5/77; Y02D 30/70; G06K 7/10237; G06K 19/0715; G06K 7/10128
(Continued)

(56) References Cited

U.S. PATENT DOCUMENTS 9,112,546 B2 * 8/2015 Orsatti ..................... H04B 5/48
9,949,108 B2 4/2018 Cordier et al.
(Continued)

FOREIGN PATENT DOCUMENTS

EP 3672091 A1 6/2020
EP 3787193 A1 3/2021

OTHER PUBLICATIONS

INPI Search Report and Written Opinion for priority application, FR 2200146, report dated Oct. 26, 2022, 9 pgs.
(Continued)

*Primary Examiner* — Eugene Yun
(74) *Attorney, Agent, or Firm* — Crowe & Dunlevy LLC

(57) ABSTRACT

A near-field communication circuit of a first NFC device alternates, in low power mode, between: first phases of emission of field bursts and second phases spanning an entire duration separating two successive first phases. Each second phase includes a field detector enabling phase. In one implementation, the field detector enabling phase extends all along a duration of the second phase. In an alternate implementation, the field detector enabling phase is interrupted by field detector disabling phases. Each field detector disabling phase has a duration shorter than a minimum duration of each first phase.

19 Claims, 4 Drawing Sheets

(58) Field of Classification Search
USPC .......................................................... 455/41.1
See application file for complete search history.

(56) References Cited

U.S. PATENT DOCUMENTS

| | | | | |
|---|---|---|---|---|
| 11,169,251 | B2 * | 11/2021 | Sahin | H04B 7/0617 |
| 2004/0077383 | A1 * | 4/2004 | Lappetelainen | H04W 52/0229 455/574 |
| 2013/0045679 | A1 * | 2/2013 | Orsatti | H04B 5/48 455/132 |
| 2013/0123882 | A1 * | 5/2013 | Towe | A61N 1/37205 29/601 |
| 2014/0113551 | A1 * | 4/2014 | Krishnan | H04B 5/24 455/90.3 |
| 2020/0204215 | A1 | 6/2020 | Rozman et al. | |
| 2020/0412413 | A1 | 12/2020 | Tramoni et al. | |
| 2021/0067198 | A1 | 3/2021 | Tramoni | |
| 2021/0328625 | A1 | 10/2021 | Tramoni et al. | |

OTHER PUBLICATIONS

EP First Office Action for counterpart, EP 22216803.1, report dated Feb. 14, 2025, 5 pgs.
CN First Office Action and Search Report for counterpart, CN Appl. No. 202310031306.2, report dated Jun. 16, 2026, 8 pgs.

* cited by examiner

DEV1
DEV2
100A
100B
102A
102B
CC
CC
NFC
NFC
EMF 102A
201
CPU
203
FIELD DET
TIMER
205
FCT
207
ANT
209

301
303

401
M
301
301
301
301'
MW
THH
THL
t

SEQ
301
303
303
301
303
REQ
501
303
301
303
301
t

601
ENABLE FIELD DET
FIELD DET PHASE DURATION ELAPSED ?
603
N
Y
605
1ST BURST ?
N
Y
START TIMER
607
609
2ND BURST ?
N
Y
READ TIMER
611
613
200 ms < D1 < 400ms & 10 µs < D2 < 50 µs ?
N
Y
617
DISABLE FIELD DET AND EMIT BURST
DISABLE FIELD DET AND START POLLING
615

PH2
PH1
PH2
PH1
PH2
701
D2
703
DEV2
PH1
PH2
PH1
PH2
PH1
DEV1
TIMER
t0
t1
t2
t3
t4
t5
t6
t7
t
D1

NFC DEVICE DETECTION

PRIORITY CLAIM

This application claims the priority benefit of French Application for Patent No. 2200146, filed on Jan. 10, 2022, the content of which is hereby incorporated by reference in its entirety to the maximum extent allowable by law.

TECHNICAL FIELD

The present disclosure generally relates to electronic circuits and, more specifically, to electromagnetic transponders or electronic tags. The present disclosure particularly applies to electronic devices integrating a near-field communication (NFC) circuit, more commonly called NFC devices, and to the detection of the presence of such a device in the field of another device.

BACKGROUND

Communication systems comprising electromagnetic transponders are more and more frequent, particularly since the development of near-field communication technologies. These systems typically use a radio frequency electromagnetic field generated by an NFC device (terminal or reader) to detect and then communicate with another NFC device (card) located within range.

Most of the time, NFC devices are battery-powered. Periods of use of their functions and circuits are then generally interrupted by standby periods. Standby periods particularly enable to lower the power consumption of NFC devices. An NFC device then has to be "woken up" when it detects an electronic tag or another device within range. It is however advantageous to ascertain for NFC devices to remain at standby as long as possible.

There is accordingly a need in the art to reduce all or part of the disadvantages of known techniques of detection of the presence of an electronic device integrating a near-field communication circuit by another electronic device emitting an electromagnetic field, more particularly during standby periods.

SUMMARY

In an embodiment, a near-field communication circuit of a first NFC device alternates, in low power mode, between: first phases of emission of field bursts and second phases spanning an entire duration separating two successive first phases, each second phase comprises a third phase of enabling a field detector, wherein the third phase: A) extends all along the second phase; or B) is interrupted by fourth phases of disabling of the field detector, wherein each fourth phase has a duration shorter than a minimum duration of each first phase.

According to an embodiment, in option B), the duration of each fourth phase for disabling of the field detector is at least ten times shorter, preferably at least fifty times shorter, than the minimum duration of each first phase.

According to an embodiment, the first NFC device switches to an operating mode of transmission of a polling sequence such as defined in the NFC Forum specifications when a second NFC device is detected within range.

According to an embodiment, the second NFC device is detected by the field detector of the first NFC device during one of the second phases.

According to an embodiment, the second NFC device is detected by the field detector of the first NFC device as a result of an emission, by the second NFC device, of at least one field burst.

According to an embodiment, the presence of the second NFC device within range is confirmed by an estimation, by the near-field communication circuit of the first NFC device, of an oscillation frequency of said at least one field burst emitted by the second NFC device.

According to an embodiment, each field burst emitted by the second NFC device has a duration equal to approximately 60 μs.

According to an embodiment, the second NFC device is detected within range as a result of an emission, by the second NFC device, of a single field burst.

According to an embodiment, the second NFC device is detected within range as a result of an emission, by the second NFC device, of successive first and second field bursts.

According to an embodiment, the presence of the second NFC device within range is confirmed by an estimation of a duration separating the successive first and second field bursts.

According to an embodiment, the duration separating the successive first and second field bursts is estimated by a counter of the first NFC device.

According to an embodiment, the presence of the second NFC device within range is confirmed by an estimation of a duration of the second field burst.

According to an embodiment, the first and second NFC devices are configured to communicate in peer-to-peer mode.

An embodiment provides a computer program product, comprising a non-transient storage support comprising instructions adapted to the implementation of the method such as described.

An embodiment provides an electronic circuit capable of implementing the method such as described.

An embodiment provides an electronic device comprising a computer program product such as described or an electronic circuit such as described.

BRIEF DESCRIPTION OF THE DRAWINGS

The foregoing and other features and advantages of the present invention will be discussed in detail in the following non-limiting description of specific embodiments and implementation modes in connection with the accompanying drawings, in which.

DETAILED DESCRIPTION

Figures 1, 2, 3, 4:
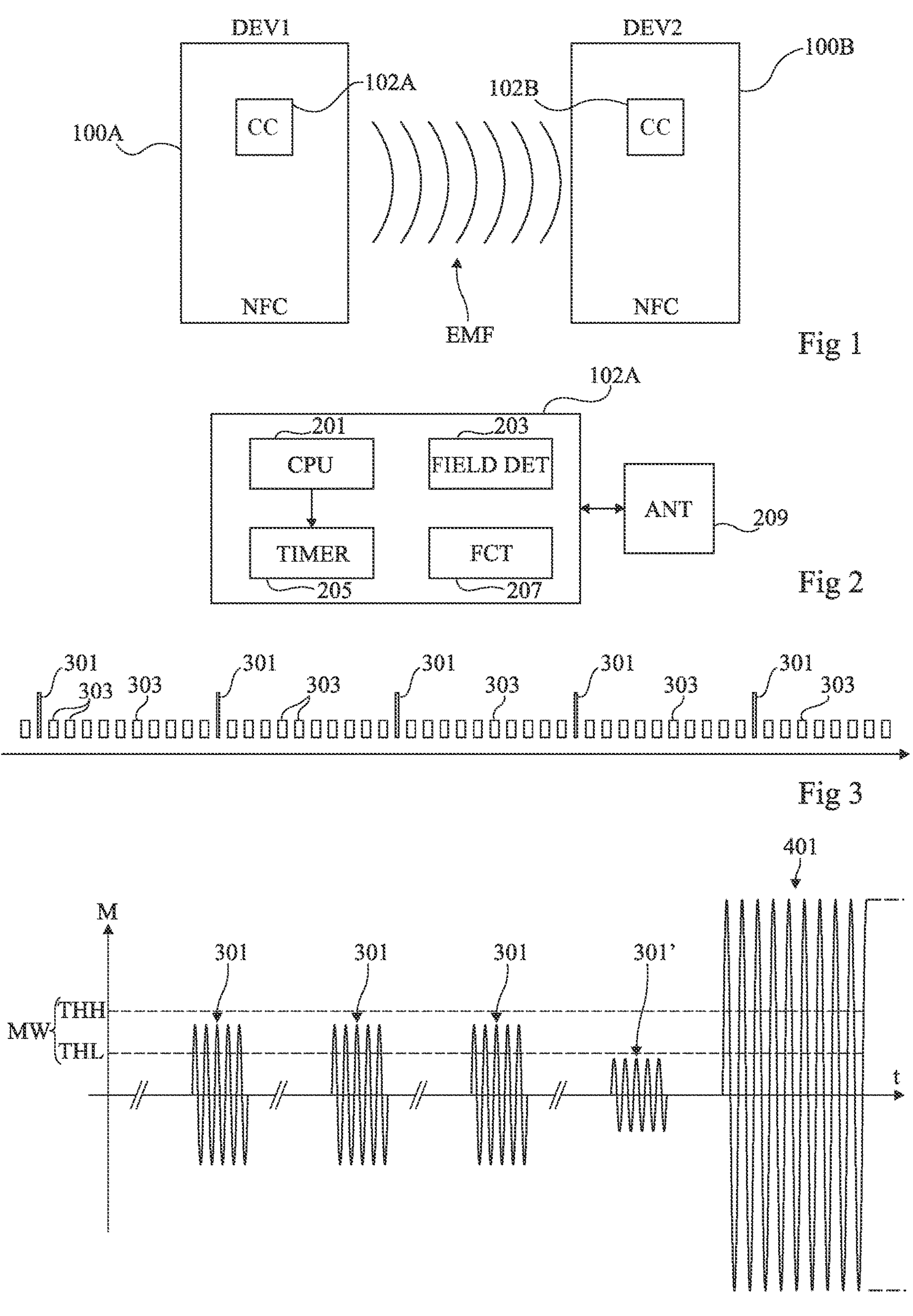
FIG. 1 very schematically shows in the form of blocks an example of a near-field communication system of the type to which described embodiments and implementation modes apply as an example.
FIG. 2 schematically shows in the form of blocks an example of a near-field communication circuit.
FIG. 3 is a timing diagram illustrating an example of operation of a method of detection, by a device in reader/writer mode and standby, of a device in card emulation mode.
FIG. 4 is a timing diagram illustrating another example of operation of the method of detection, by a device in reader/writer mode and at standby, of a device in card emulation mode.

Like features have been designated by like references in the various figures. In particular, the structural and/or functional elements common to the different embodiments and implementation modes may be designated with the same reference numerals and may have identical structural, dimensional, and material properties.

For clarity, only those steps and elements which are useful to the understanding of the described embodiments and implementation modes have been shown and will be detailed. In particular, the generation of the radio frequency signals and their interpretation have not been detailed, the described embodiments and implementation modes being compatible with usual techniques of generation and interpretation of these signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms “front”, “back”, “top”, “bottom”, “left”, “right”, etc., or to relative positional qualifiers, such as the terms “above”, “below”, “upper”, “lower”, etc., or to qualifiers of orientation, such as “horizontal”, “vertical”, etc., reference is made to the orientation shown in the figures.

Unless specified otherwise, the expressions “around”, “approximately”, “substantially” and “in the order of” signify within 10%, and preferably within 5%.

FIG. 1 very schematically shows in the form of blocks an example of a near-field communication system of the type to which described embodiments and implementation modes apply as an example.

The case of two similar electronic devices, for example, two cell phones, is arbitrarily assumed, but all that is described more generally applies to any system where a reader or terminal radiates an electromagnetic field likely to be captured by a transponder, be it an electronic tag, a microcircuit card (“IC card”), a more advanced device (a telephone, for example), etc. For simplification, reference will be made to NFC devices to designate electronic devices integrating one or a plurality of near-field communication (NFC) circuits.

In the shown example, a first NFC device 100A (DEV1) is likely to communicate, by near-field electromagnetic coupling, with a second NFC device 100B (DEV2). According to applications, for a communication, one of NFC devices 100A, 100B operates in so-called reader/writer mode while the other NFC device 100B, 100A operates in so-called card emulation mode, or the two NFC devices 100A and 100B communicate in peer-to-peer mode (P2P).

Each NFC device 100A, 100B integrates a near-field communication circuit (CC) symbolized, in FIG. 1, by a block 102A, 102B. Near-field communication circuits 102A and 102B each comprise various components or electronic circuits for generating or detecting a radio frequency signal by means of an antenna (not shown), for example, modulation or demodulation circuits. During a communication between NFC devices 100A and 100B, the radio frequency signal generated by one of NFC devices 100A, 100B is captured by the other NFC device 100B, 100A located within range.

In FIG. 1, it is arbitrarily assumed that the first NFC device 100A emits an electromagnetic field (EMF) detected by the second NFC device 100B within range. A coupling thus forms between two oscillating circuits, in the case in point that of the antenna of first NFC device 100A and that of the antenna of second NFC device 100B. This coupling results in a variation of the load formed by the circuits of NFC device 100B on the oscillating circuit for generating the field EMF of NFC device 100A.

In practice, to establish a communication, a phase or amplitude variation of the emitted field is detected by device 100A, which then starts a protocol of NFC communication with device 100B. On the side of NFC device 100A, a detection is made, in practice, whether the amplitude of the voltage across the oscillating circuit and/or the phase shift with respect to the signal generated by circuit 102A deviate from amplitude and/or phase ranges (or windows), each delimited by thresholds.

Once NFC device 100A has detected the presence of NFC device 100B in its field, it starts a procedure for establishing a communication, implementing transmissions of requests by NFC device 100A and of responses by NFC device 100B (polling sequence such as defined in the NFC Forum specifications). The circuits of NFC device 100B, if they were in standby mode, are then re-enabled.

When an NFC device is not communicating, a switch is made to the so-called low power mode, or standby mode, to decrease power consumption. This is, in particular, true for NFC devices powered by batteries. In the low-power mode, an NFC device configured in reader/writer mode executes a so-called low power card detection (LPCD) mode, also called low power tag detection (LPTD), where it performs loops of detection of another device located in its field (within range) to leave a standby mode for communication purposes.

The detection operation is similar to that performed when the device is not in low power mode. However, in normal mode, the emission of the carrier (of the field) is continuous and periodically includes polling phases while, in standby mode, the emission of the field is performed in periodic bursts and with no polling frame in order to decrease power consumption. The bursts have a duration much shorter (by a ratio of at least ten, preferably of at least one hundred) than the duration of a card polling request in normal mode.

To simplify the following description, what is happening at the level of one of the devices (for example, first device 100A, FIG. 1) is considered. It should, however, be noted that in the presence of two similar devices 100A and 100B (that is, which are capable of operating both in card emulation mode and in reader/writer mode—for example, two cell phones), the described operation is similar for the two devices. In particular, the two devices in low power mode are in low power card detection mode (LPCD mode).

FIG. 2 schematically shows in the form of blocks an example of embodiment of a near-field communication circuit, for example, circuit 102A of first NFC device 100A.

In the shown example, near-field communication circuit 102A comprises a calculation circuit 201 (central processing unit—CPU), for example, a state machine, a microcontroller, a microprocessor, a programmable logic circuit, etc. In this example, circuit 102A further comprises a field detector 203 (FIELD DET). The field detector 203 of NFC device 100A is, for example, configured to detect an electromagnetic field radiated by NFC device 100B when this device is located within range of NFC device 100A.

In the example illustrated in FIG. 2, near-field communication circuit 102A further comprises a counter 205 (TIMER) controlled by calculation circuit 201. Circuit 102A may further comprise various other elements or circuits according to the application, for example, a signal generator, analog-to-digital and/or digital-to-analog converters, modulation and/or demodulation circuits, an impedance matching circuit, a filter circuit, etc. These elements and circuits are symbolized, in FIG. 2, by a single functional block 207 (FCT). Although this has not been detailed in FIG. 2, near-field communication circuit 102A may further comprise one or a plurality of volatile and/or non-volatile storage areas, one or a plurality of data, address, and/or control buses between the different elements internal to circuit 102B, and one or a plurality of input-output interfaces of communication with the outside of circuit 102A.

In the example shown, circuit 102A is connected to an antenna 209 (ANT) for transmitting and receiving radio frequency signals, antenna 209 being in particular configured for emitting the electromagnetic field EMF.

The near-field communication circuit 102B of second NFC device 100B is, for example, identical or similar to the near-field communication circuit 102A of first NFC device 100A.

FIG. 3 is a timing diagram illustrating an example of operation of a method of detection, by a device in reader/writer mode and at standby, for example, NFC device 100A, of a device in card emulation mode, for example NFC device 100B.

When it is in standby mode, NFC device 100A, which attempts to detect the presence of the NFC device 100B within range, periodically emits a field burst 301. Detection field burst 301 generally only comprises the carrier, typically at 13.56 MHz, with no modulation. Each field burst 301 thus includes a train of pulses at the 13.56-MHz frequency. Each field burst 301 has a relatively short duration with respect to an interval between two consecutive field bursts 301, preferably by a ratio of at least one hundred. The interval between two consecutive field bursts 301 depends on the devices, but is generally of a few hundreds of milliseconds, for example, the frequency of field bursts 301 in LPCD mode is in the order of a few hertz, for example, in the order of 3 or 4 Hz. The duration of each field burst 301 is in the order of some ten or some hundred microseconds, for example, equal to approximately 30 μs.

As an example, device 100A temporarily and periodically leaves the standby mode to emit field bursts 301. Generally, it is however preferred to use a state machine for the emission of field bursts 301 in low power mode. This avoids waking up a microcontroller, for example, the calculation circuit 201, of NFC device 100A and thus enables it to remain in standby mode.

Between field bursts 301, NFC device 100A attempts to detect an electromagnetic field emitted by an NFC device located within range, for example, NFC device 100B. In the shown example, NFC device 100A enables, a plurality of times, the field detector 203 of near-field emission circuit 102A between two successive field bursts 301. The phases of enabling of field detector 203 are symbolized, in FIG. 3, by blocks 303. Each phase 303 of enabling of field detector 203 has a duration in the order of some ten microseconds, for example equal to approximately 50 μs. The phases 303 of enabling of field detector 203 are, for example, periodically repeated at a frequency in the order of one kilohertz, for example, equal to approximately 1 kHz. To decrease, in particular, the power consumption of device 100A, field detector 203 is disabled between phases 303. Accordingly, if a field capable of being sensed by device 100A is emitted during a period separating two successive phases 303, this field is not detected by detector 203 and microcontroller 201 is not woken up.

FIG. 4 is a timing diagram illustrating another example of operation of the method of detection, by a device in reader/writer mode and in standby mode, for example, the first NFC device 100A, of a device in card emulation mode, for example, the second NFC device 100B. FIG. 4 more particularly very schematically illustrates an example of a curve of variation, according to time t (in abscissas), of an amplitude M (in ordinates) of a signal across the oscillating circuit of the NFC device 100A operating in reader/writer mode.

In this example, NFC device 100A, which attempts to detect the presence of NFC device 100B within range, periodically emits field bursts 301. When device 100B is in the field and modifies the load of the oscillating circuit of emitter device 100A, this causes a variation of a quantity characteristic of a signal across the oscillating circuit during a corresponding field burst 301'. In practice, the modification of the load of the oscillating circuit of emitter device 100A causes an amplitude and/or phase variation of the signal across the oscillating circuit during field burst 301'.

The amplitude and/or phase variations are, for example, detected by variations of signals in phase (I) or in phase quadrature (Q) supplied by a baseband detector measuring the signal across the oscillating circuit. These signals I and Q represent quantities characteristic of the signal across the oscillating circuit.

In the examples of FIG. 4, it is arbitrarily assumed that the presence of device 100B causes an amplitude decrease (field burst 301'). However, the presence of device 100B may, according to cases, also cause an increase in the amplitude. The same applies for the phase shift with respect to the transmitted signal.

In the example shown in FIG. 4, if amplitude variation M is sufficient to deviate from an amplitude window or range MW, delimited by a lower threshold THL (or low threshold) and by an upper threshold THH (or high threshold), or to deviate from a phase range or window, not shown, noted PW, emitter device 100A is enabled (leaves the low power mode). It starts emitting the field with polling frames 401 of a communication. These frames are standardized (they comply with the technical specifications of the NFC Forum) and are a function of communication protocols supported by reader 100A (typically, requests A, B, F, V such as described in the standard polling loop of the NFC Forum standard). The duration of emission of a frame is generally in the range from a few milliseconds to a few tens of milliseconds.

If a device configured in card emulation mode, for example, receiver device 100B (in card emulation mode), is effectively present, this device then responds according to the request of the protocol that is supported and the communication starts. When the communication is over, or when receiver device 100B leaves the field, emitter device 100A switches back to the low power mode after a given time (in the order of one second) to decrease its power consumption. It then starts periodically emitting detection bursts 301 with no communication request again.

However, if no device configured in card emulation mode is present, within range, at the time when device 100A is enabled after having considered that it has detected a card, the communication cannot be established. Emitter device 100A returns, for example, to the low power mode after a given time (in the order of one second) to decrease its power consumption. It then starts periodically emitting detection bursts 301 with no communication request again.

A disadvantage of the method disclosed hereabove in relation with FIGS. 3 and 4 lies in the fact that the detection of NFC device 100B by NFC device 100A is performed when these devices are separated by a very short distance, shorter than a few centimeters, for example, shorter than 2.5 cm. The distance from which NFC device 100A may detect the NFC device 100B located within range is, in particular, shorter than a maximum distance between NFC devices 100A and 100B during communication phases subsequent to the detection. This results in a poor user experience.

Figures 5, 6, 7:
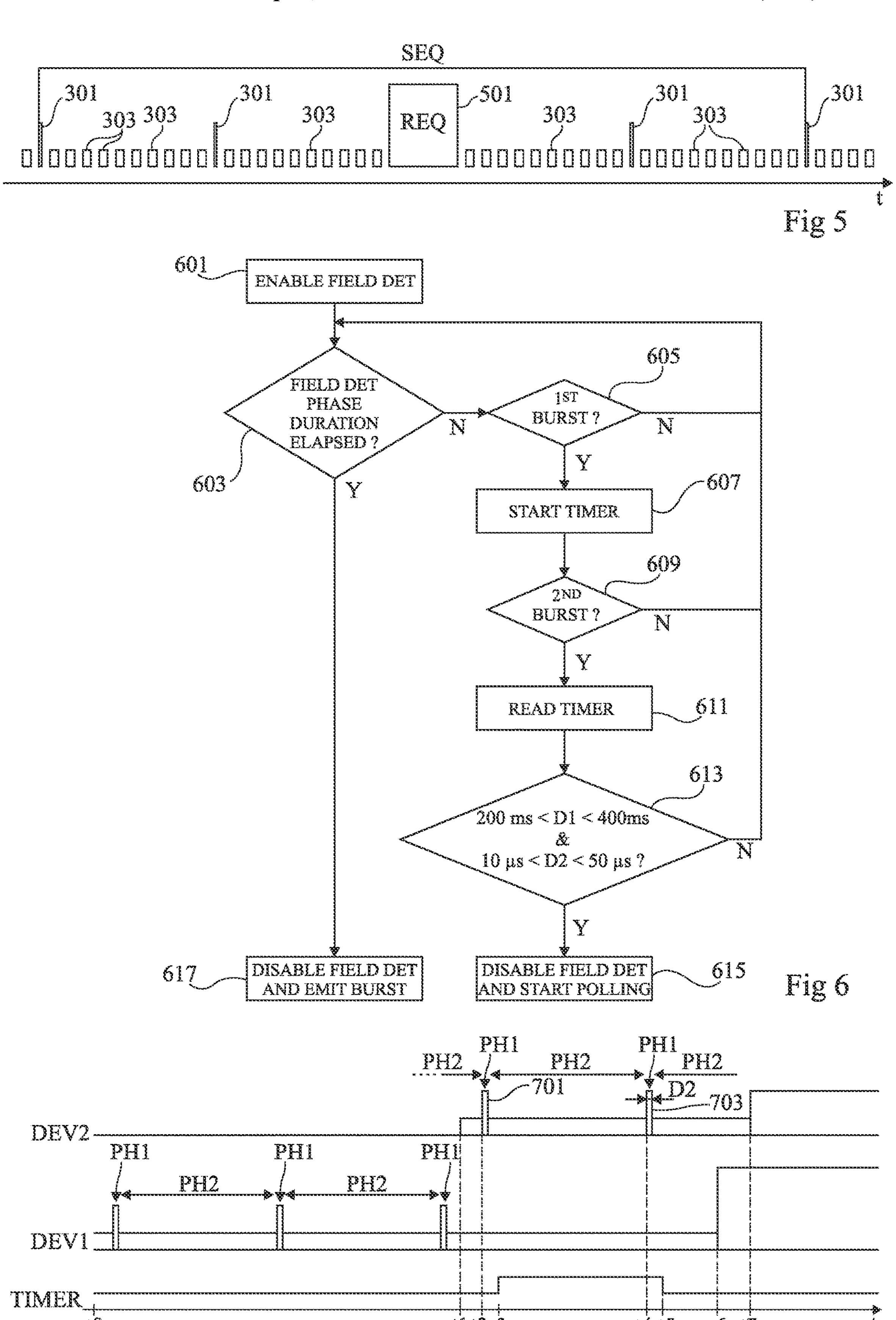
FIG. 5 is a timing diagram illustrating an example of operation of another method of detection, by a device in reader/writer mode and at standby, of a device in card emulation mode.
FIG. 6 very schematically shows in the form of blocks an implementation mode of a method of detection and of validation of the detection, by a device in reader/writer mode and at standby, of another device in reader/writer mode and at standby.
FIG. 7 illustrates, in timing diagrams, an example of operation of the method of FIG. 6.

FIG. 5 is a timing diagram illustrating an example of operation of another method of detection, by a device in reader/writer mode and at standby, of a device in card emulation mode.

The method of FIG. 5 comprises elements common with the method of FIG. 3. These common elements will not be described again hereafter. The method of FIG. 5 differs from the method of FIG. 3 in that, in the method of FIG. 5, a field burst 301 is replaced, for each periodic sequence SEQ of the LPCD mode, with a polling frame 501. Polling frame 501 is, for example, similar to the polling frame 401 previously described in relation with FIG. 4. Frame 501, for example, comprises a request A (REQ) such as described in the NFC Forum standard. Sequence SEQ for example has a duration equal to approximately 1 sec., polling frame 501 being in this case emitted once per second approximately.

The emission of polling frame 501 enables NFC device 100A to more easily detect the NFC device 100B located within range. This particularly allows a detection when the two devices 100A and 100B are separated by a distance close to the maximum distance of communication between these two devices. However, a disadvantage linked to the emission of frame 501 is that this requires emitting at full power for a duration equal to approximately 10 ms once every second (approximately). This results in a more significant power consumption of NFC device 100A, for example, in the range from 1 to 5 mA, which adversely affects its autonomy.

The methods described hereabove in relation with FIGS. 3 to 5 can be transposed to the case where NFC devices 100A and 100B are both in reader/writer mode and attempt to mutually detect each other, for example, to establish a communication in peer to peer mode (P2P). These methods have, in this case, disadvantages similar to those previously described.

FIG. 6 very schematically shows in the form of blocks an implementation mode of a method of detection and of validation of the detection, by a device in reader/writer mode and at standby, for example, NFC device 100A, of another device in reader/writer mode and at standby, for example, NFC device 100B.

According to this implementation mode, the near-field communication circuit 102A of NFC device 100A alternates, in low power mode, between: first phases of emission of field bursts; and second phases spanning the entire duration separating two first successive emission phases. Each second phased comprises a third phase (PH2) of enabling of a field detector (203) extending all along the second phase.

In the example illustrated in FIG. 6, the method starts with a step 601 (ENABLE FIELD DET) of enabling of the field detector 203 of the near-field communication circuit 102A of NFC device 100A. This enables NFC device 100A to be able to detect a possible electromagnetic field radiation by another device, for example, NFC device 100B, located nearby. A second phase of enabling of field detector 203, for example, consecutive to a first field burst emission phase is thus started.

At another step 603 (FIELD DET PHASE DURATION ELAPSED?), subsequent to step 601, a verification is made as to whether the duration of the second field detection phase has elapsed. As long as the duration of the second phase has not elapsed, that is, until the first next field burst emission phase, field detector 203 remains enabled.

As long as the duration of the second field detection phase has not elapsed (output N of block 603), an attempt is made, at another step 605 ($1^{ST}$ BURST?), to detect a first field burst emitted by NFC device 100B in reader/writer mode. In the case where a first field burst is detected by the field detector 203 of NFC device 100A (output Y of block 605), the counter 205 of the near-field communication circuit 102A of NFC device 100A is started at a subsequent step 607 (START TIMER). However, if no field burst is detected (output N of block 605), the process returns to step 603 of control of the elapsing of the duration of the second field detection phase.

After having started the counter at step 607, NFC device 100A attempts, at another step 609 ($2^{ND}$ BURST?), to detect a second field burst potentially emitted by NFC device 100B. In the case where a second field burst is detected by the field detector 203 of NFC device 100A (output Y of block 609), the value of counter 205 is read at a subsequent step 611 (READ TIMER). However, if NFC device 100A detects no second field burst (output N of block 609) at the end of a duration for example equal to approximately 400 ms, the process returns to step 603 of control of the elapsing of the duration of the second field detection phase.

At a step 613 (200 ms<D1<400 ms & 10 μs<D2<50 μs?) subsequent to step 611, a first duration D1 separating the first and second field bursts, respectively detected at steps 605 and 609, and a second duration D2, are controlled. More precisely, in the shown example, a verification is made that first duration D1 is within a first interval, for example, from 200 to 400 ms, and that second duration D2 is within a second interval, for example, from 10 to 50 μs. In the case where first and second durations D1 and D2 are respectively within the first and second intervals (output Y of block 613), it is considered that the presence of NFC device 100B in LPCD mode and within range is confirmed and the process then proceeds to a step 615 (DISABLE FIELD DET AND START POLLING) during which NFC device 100A disables field detector 203 and then emits a polling frame, for example, similar to frames 401 and 501. However, if at least one of the first and second durations D1 and D2 is not respectively within the provided interval (output N of block 613), it is considered that the presence of NFC device 100B in LPCD mode and within range is not confirmed and the process then returns to step 603 of control of the elapsing of the duration of the field detection phase. As a variant, it may be provided to control a single duration among durations D1 and D2.

In the case where the detection of no NFC device is validated during the second field detection phase (output Y of block 603), the process then proceeds to a step 617 (DISABLE FIELD DET AND EMIT BURST) corresponding to the beginning of a first phase during which NFC device 100A disables field detector 203 and then emits a field burst. Once the field burst has been emitted, the process then, for example, returns to step 601.

FIG. 7 illustrates, in timing diagrams, an example of operation of the method of FIG. 6.

Between a time t0 and a time t1, subsequent to time t0, NFC device 100A (DEV1) alternates, in LPCD mode, between the first phases (PH1) of emission of field bursts and second phases which each include the third phase (PH2) of enabling of field detector 203. In this example, field detector 203 remains permanently enabled all along the duration of each second phase PH2, that is, between two first successive phases PH1.

At time t1, NFC device 100B in LPCD mode, which (for example) also alternates between the first field burst emission phases PH1 and the third phases PH2 of enabling of its field detector, is placed within range of NFC device 100A. At time t1, NFC devices 100A and 100B are both in second phase PH2.

At a time t2, subsequent to time t1, NFC device 100B emits, during a phase PH1, a first field burst 701. First burst 701 is detected by NFC device 100A. This causes, for example, the waking up of calculation unit 201 and the starting of the counter (TIMER) at a time t3, subsequent to time t2. From time t3, phases PH1 of emission of field bursts by NFC device 100A are temporarily suspended and the field detector 203 of NFC device 100A is maintained enabled for a duration sufficient to enable to detect a possible field burst consecutive to first field burst 701. As an example, the field detector 203 of NFC device 100A is maintained enabled for a duration equal to approximately 0.4 sec. from time t3.

At a time t4 subsequent to time t3, NFC device 100B emits, during another first phase PH1, a second field burst 703. Second burst 703 is detected by NFC device 100A, which stops counter TIMER at a time t5, subsequent to time t4. NFC device 100A then estimates the duration D1 separating first field burst 701 from second field burst 703, and the duration D2 of second field burst 703. In practice, the duration D1 between the first and second bursts 701 and 703 is, for example, estimated by counter TIMER by estimating the duration separating times t3 and t4, time t3 for starting of the counter being very close to time t2 for detection of first burst 701 by NFC device 100A. As a variant, it may be provided to increase the accuracy of the estimation of duration D1 by adding, to the duration estimated by counter TIMER, a duration estimative of the wake-up phase of calculation unit 201, that is, of the duration separating times t2 and t3. Duration D2 may be estimated by counter TIMER or by another counter of NFC devices 100A.

At a time t6, subsequent to time t5, NFC device 100A disables field detector 203 and then emits a polling frame, for example, a frame comprising requests A, B, F, V such as described in the standard polling loop of the NFC Forum standard.

Ata time t7, subsequent to time t6, NFC device 100B responds to NFC device 100A and the communication between devices 100A and 100B can then be considered as established.

An implementation mode where the detection of NFC device 100B by NFC device 100A is validated after the reception, by NFC device 100A, of two successive field bursts 701 and 703 emitted by NFC device 100B, has been described hereabove. As a variant, it may be provided to omit the validation. More precisely, it may for example provided for NFC device 100A to emit a polling frame without waiting for second burst 703, for example, from as soon as time t3. In this case, the steps of starting and reading of counter TIMER may be omitted. However, the fact of providing a validation at the end of second burst 703 advantageously enables to avoid emitting a polling frame as a result, for example, of the detection at time t2 of a disturbance which does not correspond to the presence of an NFC device within range. An undesirable power consumption is thus avoided.

Figure 8:
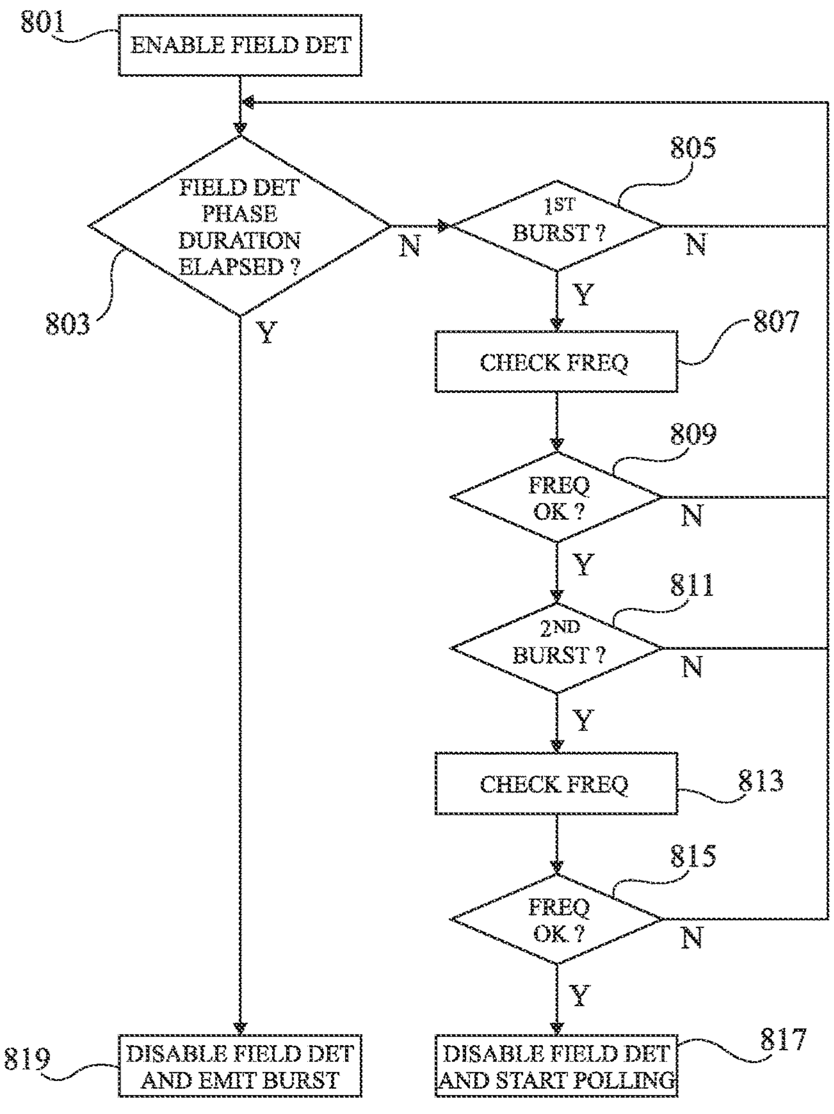
FIG. 8 very schematically shows in the form of blocks another implementation mode of a method of detection and of validation of the detection, by a device in reader/writer mode and at standby, of another device in reader/writer mode and at standby.

FIG. 8 very schematically shows in the form of blocks another implementation mode of a method of detection, by a device in reader/writer mode and at standby, for example, NFC device 100A, of another device in reader/writer mode and at standby, for example, NFC device 100B.

According to this implementation mode, the field bursts respectively emitted by the first and second NFC devices 100A and 100B during first phases PH1 have a duration longer than in the implementation mode previously discussed in relation with FIGS. 6 and 7. The field bursts each have, for example, in the implementation mode of FIG. 8, a duration twice longer than in the implementation mode of FIGS. 6 and 7, for example, equal to approximately 60 μs. This enables, as discussed in further detail hereafter, to estimate the oscillation frequency of the field bursts.

In the example illustrated in FIG. 8, the method starts with a step 801 (ENABLE FIELD DET) of enabling of the field detector 203 of the near-field communication circuit 102A of NFC device 100A. This enables device 100*a* to be able to detect a possible electromagnetic field radiated by another device, for example, NFC device 100B, located within range.

At another step 803 (FIELD DET PHASE DURATION ELAPSED?), subsequent to step 801, a verification is made as to whether the duration of a phase of detection of field PH2 has elapsed. Field detection phase PH2 corresponds to the phase spanning the entire duration separating two successive field burst emission phases. As long as this duration has not elapsed, field detector 203 remains enabled.

As long as the duration of field detection phase PH2 has not elapsed (output N of block 803), an attempt is made, at another step 805 ($1^{ST}$ BURST?), to detect a first field burst emitted by NFC device 100B. In the case where a first field burst is detected by the field detector 203 of NFC device 100A (output Y of block 805), the oscillation frequency of the first field burst is estimated at a subsequent step 807 (CHECK FREQ). However, if no field burst is detected (output N of block 805), the process returns to step 803 of control of the elapsing of the duration of field detection phase PH2.

At a step 809 (FREQ OK?) subsequent to step 807 of estimation of the oscillation frequency of the first field burst, the process controls whether this frequency is in the order of the frequency of a detection burst likely to be emitted by NFC device 100B, for example, equal to approximately 13.56 MHz. In this case, an attempt is made, at a step 811 ($2^{ND}$ BURST?), to detect a second field burst emitted by NFC device 100B. However, if the measured frequency does not correspond to the expected frequency (output N of block 809), the process returns to step 803 of control of the elapsing of the duration of field detection phase PH2.

In the case where a second field burst is detected by the field detector 203 of NFC device 100A (output Y of block 811), the oscillation frequency of the second field burst is estimated at a subsequent step 813 (CHECK FREQ). However, if the second field burst is not detected (output N of block 811) at the end of a duration for example equal to approximately 400 ms, the process returns to step 803 of control of the elapsing of the duration of field detection phase PH2.

At a step 815 (FREQ OK?), subsequent to step 813, of estimation of a second oscillation frequency of the second field burst, the process controls whether the second frequency is in the order of the frequency of a detection burst likely to be emitted by NFC device 100B, for example, equal to approximately 13.56 MHz. In the case where the first and second frequencies correspond to the expected frequencies, it is considered that the presence of NFC device 100B in LPCD mode and within range is confirmed and the process proceeds to a step 817 (DISABLE FIELD DET AND START POLLING) during which NFC device 100A disables field detector 203 and then transmits a polling frame. However, if at least one of the first and second frequencies do not correspond to the expected frequency (output N of block 815), it is considered that the presence of device 100B in LPCD mode and within range is not confirmed and the process then, for example, returns to step 803 of control of the elapsing of the duration of the field detection phase.

In the case where the detection of no NFC device is validated during the field detection phase (output Y of block 803), the process then passes to a step 819 (DISABLE FIELD DET AND EMIT BURST) during which NFC device 100A disables field detector 203 and then emits a field burst.

The steps 801, 803, 805, 811, 817, and 819 of the method of FIG. 8 are, for example, identical or similar to the steps 601, 603, 605, 609, 615, and 617, respectively, of the method of FIG. 6.

Figure 9:
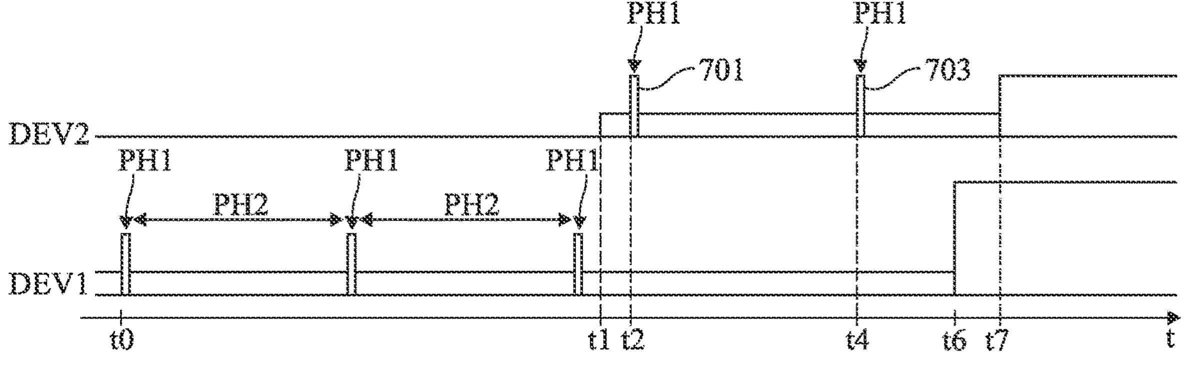
FIG. 9 illustrates, in timing diagrams, an example of operation of the method of FIG. 8.

FIG. 9 illustrates, in timing diagrams, an example of operation of the method of FIG. 8. The timing diagrams of FIG. 9 comprise elements common with the timing diagrams of FIG. 7. These common elements will not be described again hereafter.

The timing diagram of FIG. 9 differs from the timing diagram of FIG. 7 mainly in that, in the timing diagram of FIG. 9, the counter starting and stopping times t3 and t5 are omitted. Further, in the timing diagram of FIG. 9, the field bursts respectively emitted by the first and second devices during phases PH1 have a longer duration than the field bursts emitted during the phases PH1 of the timing diagram of FIG. 7.

An implementation mode where the detection of NFC device 100B by NFC device 100A is validated after the reception, by NFC device 100A, of two successive field bursts 701 and 703 emitted by NFC device 100B and control of the oscillation frequency of these field bursts has been described hereabove. As a variant, it may be provided to omit the control of the oscillation frequency of second field burst 703. Further, it may, for example, be provided for NFC device 100A to emit a polling frame without waiting for second burst 703, for example as soon as the oscillation frequency of first burst 701 is verified. However, the fact of providing a validation at the end of second burst 703 advantageously enables to avoid emitting a polling frame as a result, for example, of the detection at time t2 of a disturbance which does not correspond to the presence of an NFC device within range. An undesirable power consumption is thus avoided.

There has been described hereabove in relation with FIGS. 6 to 9 implementation modes where the third phases PH2 of enabling of field detector 203 span the entire duration separating two first phases PH1 of emission of successive field bursts.

Figure 10:
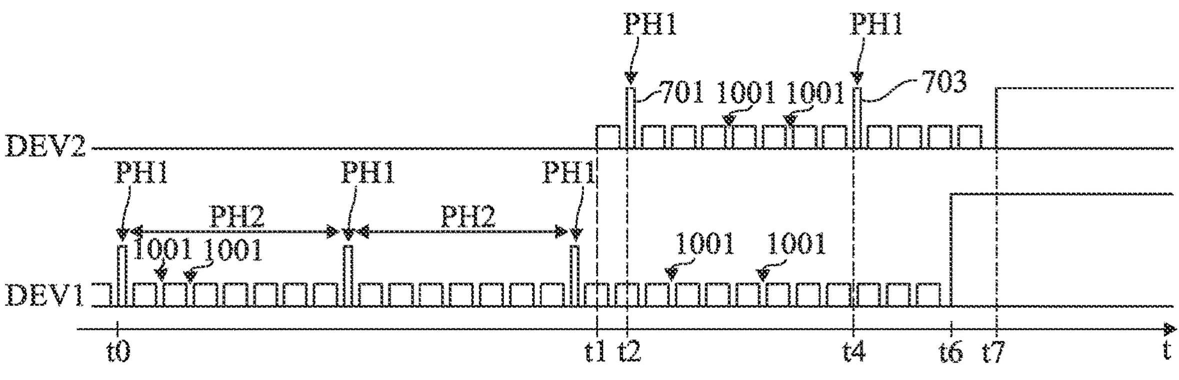
FIG. 10 very schematically shows in the form of blocks still another implementation mode of a method of detection and of validation of the detection, by a device in reader/writer mode and at standby, of another device in reader/writer mode and at standby.

FIG. 10 very schematically shows in the form of blocks still another implementation mode of a method of detection and of validation of the detection, by a device in reader/writer mode and at standby, of another device in reader/writer mode and at standby.

The method of FIG. 10 differs from the methods of FIGS. 6 to 9 in that, according to the implementation mode illustrated in FIG. 10, each third phase PH2 of enabling of field detector 203 extending between two first successive emission phases PH1 is interrupted by fourth phases 1001 of disabling the field detector 203. According to an embodiment, each fourth phase 1001 of disabling the field detector 203 has in this case a duration shorter than the minimum duration of emission phases PH1, preferably ten times shorter, more preferably fifty times shorter, than the minimum duration of phases PH1. As an example, each phase 1001 has a duration equal to approximately 1 μs. It may be provided, as illustrated in FIG. 10, for the phases 1001 of disabling of field detector 203 to be periodically repeated between field burst emission phases PH1.

The implementation mode discussed in relation with FIG. 10 provides advantages identical or similar to those previously discussed in relation with FIGS. 6 to 9 while enabling to further decrease the power consumption of NFC device 100A.

As an example, the near-field communication circuit 102A of NFC device 100A may comprise a computer program product, comprising a non-transient storage support comprising instructions adapted to the implementation of the method of FIGS. 6 and 7, of the method of FIGS. 8 and 9, or of the method of FIG. 10.

Various embodiments and variants have been described. It will be understood by those skilled in the art that certain characteristics of these various embodiments and variants may be combined, and other variants will occur to those skilled in the art. In particular, the implementation mode described in relation with FIGS. 6 and 7 may be combined with the implementation mode described in relation with FIGS. 8 and 9. It could more precisely be provided, in the implementation mode of FIGS. 8 and 9 or in the implementation mode of FIG. 10, to verify the detection of NFC device 100B by a control of the duration between first and second bursts 701 and 703 and/or a control of the duration of second burst 703.

Finally, the practical implementation of the described embodiments and variants is within the abilities of those skilled in the art based on the functional indications given hereabove.

The invention claimed is:

1. A method, comprising:

operating a near-field communication circuit of a first NFC device to alternate, in low power mode, between: first phases of emission of field bursts and second phases spanning an entire duration separating two successive first phases;

wherein each second phase comprises a third phase of enabling a field detector, wherein said third phase either:

a) extends for an entire duration of the second phase; or b) has a duration interrupted by one or more fourth phases of disabling the field detector, wherein each fourth phase has a duration shorter than a minimum duration of each first phase.

2. The method according to claim 1, wherein the duration of each fourth phase of disabling the field detector is at least ten times shorter than the minimum duration of each first phase.

3. The method according to claim 1, wherein the duration of each fourth phase of disabling the field detector is at least fifty times shorter than the minimum duration of each first phase.

4. The method according to claim 1, further comprising switching the first NFC device to an operating mode of transmission of a polling sequence when a second NFC device is detected within range.

5. The method according to claim 4, wherein transmission of the polling sequence is made in accordance with an NFC Forum specification.

6. The method according to claim 1, further comprising detecting a second NFC device by the field detector of the first NFC device during one of the second phases.

7. The method according to claim 6, wherein detecting the second NFC device comprises detecting an emission, by the second NFC device, of at least one field burst.

8. The method according to claim 7, further comprising confirming presence of the second NFC device within range by estimating, using the near-field communication circuit of the first NFC device, an oscillation frequency of said at least one field burst emitted by the second NFC device.

9. The method according to claim 8, wherein each field burst emitted by the second NFC device has a duration equal to approximately 60 μs.

10. The method according to claim 6, wherein detecting the second NFC device comprises detecting an emission, by the second NFC device, of a single field burst.

11. The method according to claim 6, wherein detecting the second NFC device comprises detecting an emission, by the second NFC device, of successive first and second field bursts.

12. The method according to claim 11, further comprising confirming presence of the second NFC device within range by estimating a duration separating the successive first and second field bursts.

13. The method according to claim 12, wherein estimating the duration separating the first and second field bursts comprises counting by the first NFC device a time between the successive first and second field bursts.

14. The method according to claim 11, further comprising confirming presence of the second NFC device within range by estimating of a duration of the second field burst.

15. The method according to claim 1, further comprising:

switching the first NFC device to an operating mode of transmission of a polling sequence when a second NFC device is detected within range; and configuring the first and second NFC devices to communicate in peer-to-peer mode.

16. A computer program product, comprising a non-transient storage support comprising instructions configured when executed by a processor to implement the method according to claim 1.

17. An electronic device comprising the computer program product according to claim 16.

18. An electronic circuit, configured to implement the method according to claim 1.

19. An electronic device comprising the electronic circuit according to claim 18.

* * * * *